United States Patent [19]

Benker et al.

[11] Patent Number: 5,303,000
[45] Date of Patent: Apr. 12, 1994

[54] METHOD OF AND APPARATUS FOR ASCERTAINING THE CHARACTERISTICS OF SHORTER AND LONGER SECTIONS OF PHOTOGRAPHIC MATERIAL

[75] Inventors: Gerhard Benker, Pullach; Ulrich Klueter; Reimund Muench, both of Munich; Erich Nagel, Anzing; Wilhelm Nitsch, Munich; Volker Weinert, Taufkirchen; Hans-Joachim Vedder, Puchheim, all of Fed. Rep. of Germany

[73] Assignee: Agfa-Gevaert Aktiengesellschaft, Leverkusen, Fed. Rep. of Germany

[21] Appl. No.: 878,768

[22] Filed: May 5, 1992

[30] Foreign Application Priority Data

Jun. 7, 1991 [DE] Fed. Rep. of Germany ....... 4118812
Feb. 26, 1992 [DE] Fed. Rep. of Germany ....... 4205922

[51] Int. Cl.⁵ ............................................. G03B 27/52
[52] U.S. Cl. ...................................... 355/41; 355/38; 355/68; 355/69; 355/1
[58] Field of Search ................. 355/38, 41, 68, 69, 355/1

[56] References Cited

U.S. PATENT DOCUMENTS

| | | | |
|---|---|---|---|
| 3,592,542 | 7/1971 | Kaüfer | 355/50 |
| 3,734,630 | 5/1973 | McIntosh et al. | 355/68 |
| 4,097,904 | 6/1978 | Wada | 355/1 |
| 4,154,500 | 5/1979 | Funato et al. | 355/1 |
| 4,193,679 | 3/1980 | Mochizuki et al. | 355/1 |
| 4,279,502 | 7/1981 | Thurm | 355/38 |
| 4,544,259 | 10/1985 | Kanaoka et al. | 355/1 |
| 4,553,833 | 11/1985 | Kanaoka et al. | 355/1 |
| 4,627,719 | 12/1986 | Nitsch | 355/41 |
| 4,632,540 | 12/1986 | Shiga | 355/68 |
| 4,947,205 | 8/1990 | Benker | 355/41 |
| 5,093,682 | 3/1992 | Hicks | 355/1 |

*Primary Examiner*—Monroe H. Hayes
*Attorney, Agent, or Firm*—Darby & Darby

[57] ABSTRACT

Strips of coherent, exposed and developed film frames are advanced past, and discrete frames are placed onto, a window at a monitoring station where successive increments of the film frames are monitored by a device having photocells forming at least one row which extends transversely of the path of advancement of strips. The monitoring device is at a standstill during advancement of strips but is transported past a discrete frame at the monitoring station. Such monitoring device can ascertain the density of film frames, and its photocells generate signals which are used to image the frames onto photographic paper.

32 Claims, 4 Drawing Sheets

METHOD OF AND APPARATUS FOR ASCERTAINING THE CHARACTERISTICS OF SHORTER AND LONGER SECTIONS OF PHOTOGRAPHIC MATERIAL

BACKGROUND OF THE INVENTION

The invention relates to improvements in methods of and in apparatus for ascertaining the characteristics of sections of photographic material, and more particularly to improvements in methods of and in apparatus for ascertaining the characteristics of shorter and longer sections of exposed and developed photographic films. Still more particularly, the invention relates to improvements in methods and apparatus which can be resorted to with advantage to ascertain the density of shorter and longer sections of photographic material, for example, (a) the density of successive frames forming part of strips or webs of coherent frames or (b) the density of discrete frames.

Commonly owned U.S. Pat. No. 4,627,719 (granted Dec. 9, 1986 to Nitsch et al. for "Method of and apparatus for reproducing the images of film frames") discloses a method of and an apparatus for ascertaining the density of running webs of exposed and developed photographic films. The films are advanced in a first direction along a predetermined path through a monitoring station to be scanned by a system of photocells which generate signals for storage in the memory of a microprocessor. Such signals are utilized to properly image the frames of the respective films onto photographic paper while the films are moved along the same path but in a second direction counter to the first direction. A pivotable mirror is provided at the monitoring station to intercept light passing through successive increments of a film which is being advanced in the first direction, and the intercepted light is directed toward the photocells so that the photocells can transmit appropriate signals to the microprocessor. The mirror is pivoted out of the way preparatory to copying so that light which passes through the frames during advancement of the film in the second direction and is modified in accordance with the respective signals can impinge upon successive increments of a running strip of photographic paper.

The method and apparatus of Nitsch et al. are quite satisfactory in connection with the monitoring and copying of relatively long sections of photographic material, i.e., one or more elongated customer films each of which comprises a long series or file of exposed and developed film frames with customary frame lines between neighboring film frames. However, the patented method and aparatus are less suited for monitoring and copying of relatively short sections of photographic material, e.g., of discrete film frames. The length of sections which can be monitored and copied in the patented apparatus is determined by the distance between the film advancing devices upstream and downstream of the monitoring station (which constitutes the copying station during advancement of a film in the second direction). The aforementioned distance exceeds the length of a single film frame; therefore, if a single film frame is to be monitored and copied, it must be provided with an extension in the form of a strip or tongue extending from and serving to permit introduction of the film frame into the patented apparatus. The necessity to provide the individual or discrete film frames with extensions contributes significantly to the cost of the copying operation, not only because the extensions must be separately produced and affixed to discrete film frames but also because the periods of time which are required for the monitoring and copying of a discrete film frame are too long.

OBJECTS OF THE INVENTION

An object of the invention is to provide a novel and improved method of ascertaining the characteristics of shorter or longer sections of photographic material.

Another object of the invention is to provide a method which renders it possible to ascertain the characteristics of relatively short sections of photographic material, e.g., discrete exposed and developed film frames, without the need for extensions or like expensive parts.

A further object of the invention is to provide a method which renders it possible to process shorter and longer film frames in one and the same apparatus without resorting to extensions for shorter sections.

An additional object of the invention is to provide a novel and improved apparatus for the practice of the above outlined process.

Still another object of the invention is to provide an apparatus which constitutes an improvement over and a further development of the apparatus disclosed in commonly owned U.S. Pat. No. 4,627,719.

A further object of the invention is to provide the apparatus with novel and improved means for monitoring the characteristics of shorter or longer sections of photographic material.

Another object of the invention is to provide the apparatus with novel and improved means for facilitating the positioning of shorter sections of photographic material at the combined monitoring and copying station for longer sections of photographic material.

An additional object of the invention is to provide the apparatus with novel and improved means for converting the component parts at the monitoring station for proper scanning of shorter or longer sections of photographic material in a simple and time-saving operation.

A further object of the invention is to provide an apparatus wherein the exact nature of means for advancing longer sections of photographic material has no bearing upon the facility of monitoring shorter sections of photographic material.

Another object of the invention is to provide the apparatus with novel and improved means for transporting the photosensitive elements relative to the monitoring station.

SUMMARY OF THE INVENTION

One feature of the present invention resides in the provision of a method of ascertaining the characteristics of at least one shorter and at least one longer section of photographic material with a mobile monitoring device. The method comprises the steps of maintaining the monitoring device at a standstill, advancing the at least one longer section relative to the thus maintained monitoring device, maintaining the at least one shorter section at a standstill, and transporting the monitoring device relative to the thus maintained at least one shorter section.

The characteristics preferably include the density of sections of photographic material. The at least one shorter section can include a single exposed and developed film frame, and the at least one longer section can include a file of successive exposed and developed film frames.

The monitoring device is preferably of the type having at least one row of photocells or other suitable photosensitive detectors, and the advancing step can include advancing the at least one longer section transversely of the at least one row of photosensitive detectors. The transporting step when preferably comprises transporting the monitoring device transversely of the at least one row of photosensitive detectors.

The advancing step includes advancing the at least one longer section in a first direction, and the method can further comprise the steps of generating with the monitoring device signals which denote the characteristics of successive increments of the at least one longer section in the course of the advancing step, moving the at least one section in a second direction counter to the first direction upon completion of the signal generating step, and utilizing the signals for imaging the at least one longer section onto photographic paper or other suitable photosensitive material in the course of the moving step.

Another feature of the invention resides in the provision of an apparatus for ascertaining the characteristics of longer and shorter sections of photographic material. The improved apparatus comprises means for advancing longer sections along a predetermined path (e.g., along a substantially horizontal path) through a monitoring station which is further arranged to receive discrete shorter sections, a monitoring device which is located at the monitoring station and has means for generating signals which denote the characteristics of successive increments of a longer section while such longer section is being advanced along the predetermined path, and means for transporting the monitoring device past a shorter section at the monitoring station so that the signal generating means can generate signals denoting the characteristics of the shorter section at the monitoring station.

The signal generating means preferably comprises at least one row of photocells or other suitable photosensitive elements, and the advancing means then preferably includes means for advancing longer sections transversely of the at least one row of photosensitive elements.

The apparatus preferably further comprises a frame having at least one window at the monitoring station. The monitoring device is disposed at the at least one window during advancement of a longer section along the predetermined path and during transport of the monitoring device past a shorter section at the monitoring station. The monitoring device is provided with a radiation admitting inlet which is adjacent a marginal portion of the at least one window while a longer section is being advanced along the predetermined path.

The monitoring device is located at one side of the predetermined path, and the apparatus preferably further comprises a radiation source (e.g., a source of visible light) at the other side of the path and means for directing radiation from the source through a shorter or longer section at the monitoring station and through the at least one window. The monitoring device is preferably further provided with means for deflecting radiation which has passed through a section at the monitoring station into a second path and radiation dividing means located in the second path and including means for diverting portions of deflected radiation against the photosensitive elements of the at least one row. The second path is or can be at least substantially parallel to the predetermined path. The deflecting means can include a first mirror (e.g., a fully reflecting mirror) and the diverting means can include partially transmitting second mirrors. The monitoring device can further comprise a housing having an inlet (e.g., in the form of an elongated narrow slot extending transversely of the predetermined path) which guides radiation against the deflecting means. At least one objective can be installed in the second path between the deflecting means and the diverting means.

The apparatus preferably further comprises an objective lens which is disposed at the one side of the predetermined path and is movable between a first position remote from and a second position nearer to but still spaced apart from the at least one window. The aforementioned housing of the monitoring device accommodates the deflecting means and the diverting means and has a portion which is provided with the radiation admitting inlet. Such portion of the housing is movable along the at least one window between the objective lens and the at least one window in each position of the objective lens.

The aforementioned frame can be provided with a first and a second window and is then movable relative to the monitoring station between a first position in which the first window is located at the monitoring station and is adjacent the predetermined path for longer sections, and a second position in which the second window is located at the monitoring station in a position to be overlapped by a shorter section. Such frame can include guide means for longer sections as well as means for holding a shorter section in a predetermined position relative to the second window. The arrangement is preferably such that the second window is accessible to an operator in the first position of the frame to permit the placing of a shorter section in a position of overlap with the second window. The apparatus can further comprise means for illuminating the second window in the first position of the frame.

The apparatus can further comprise guide means for the monitoring device, and the transporting means can comprise a rack-and-pinion drive and a motor for the drive. The guide means can comprise a stationary support, rolling elements on the support or on the housing of the monitoring device, and rails provided on the monitoring device or on the housing and engaging with and being movable along the rolling elements. The motor can constitute an electric stepping motor.

In accordance with a further embodiment, the signal generating means of the improved apparatus can comprise a plurality of photosensitive elements and optical elements each of which is arranged to image a section at the monitoring station onto one of the photosensitive elements. The optical elements can include means for imaging strip-shaped portions of a section at the monitoring station onto the respective photosensitive elements. Each such optical element can comprise a microlens with a gradual progress of refractive index. Alternatively, the optical elements can comprise a series of coherent lenses and a diaphragm for each of the coherent lenses. The coherent lenses can be of one piece.

The just outlined embodiment of the improved apparatus can further comprise a carriage for the optical elements and the respective photosensitive elements, and means (e.g., including a reversible stepping motor and a rack-and-pinion drive) for moving the carriage relative to the monitoring station along the path for longer sections.

If the sections of photographic material are multicolored sections, each optical element can be arranged to transmit a different color image of a section at the monitoring station to the respective photosensitive element. Color filters can be installed between at least some of the optical elements and the respective photosensitive elements.

The monitoring device can further comprise a computer having a memory, and means for transmitting signals from the photosensitive elements to the memory of the computer. As a rule, the photosensitive elements are or can be spaced apart from each other in the longitudinal direction of the path for the longer sections, and the transmitting means can include means for transmitting to the memory signals with a delay which corresponds to the spacing of photosensitive elements so that the signals pertaining to the same part of a particular section at the monitoring station are properly related to each other.

The embodiment of the apparatus wherein the monitoring device employs a set of optical elements can further comprise a frame having at least one window at the monitoring station. The optical elements can have a combined length (as measured in the longitudinal direction of the path for longer sections) which approximates or equals the width of the at least one window in the direction of advancement of longer sections, and the means for moving the carriage can be designed to include means for moving the carriage between a first position at one side of the at least one window, a second position at the other side of the at least one window, and a further position in which the optical elements register with the at least one window while a longer section is being advanced along its predetermined path.

The photosensitive elements can include at least one element which transmits signals denoting the gray scale value of a section at the monitoring station.

The optical elements are preferably disposed at one side of and at a predetermined distance from the path for longer sections. The means for advancing longer sections preferably comprises at least one pair of advancing rolls and such at least one pair has a roll at the one side of the path for longer sections. At least that roll of the at least one pair which is disposed at the one side of the path for longer sections has a diameter which is preferably smaller than, or at most equals, the distance of optical elements from the path for longer sections.

An additional feature of the present invention resides in the provision of an apparatus for ascertaining the characteristics of sections of photographic material. The improved apparatus comprises means defining a monitoring station for sections of photographic material, a monitoring device which is adjacent the monitoring station and has means for generating signals which denote the characteristics of increments of a section at the monitoring station, and means for effecting a relative movement between a section at the monitoring station and the monitoring device so that the signal generating means can generate signals which denote the characteristics of increments of a section at the monitoring station. The signal generating means preferably comprises a plurality of photosensitive elements and optical elements each of which serves to image a section at the monitoring station onto one of the photosensitive elements.

In accordance with one presently preferred embodiment of the just outlined apparatus, each optical element comprises a microlens with a gradual progress of refractive index. Alternatively, the optical elements can comprise a series of coherent lenses, and such coherent lenses can be of one piece.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
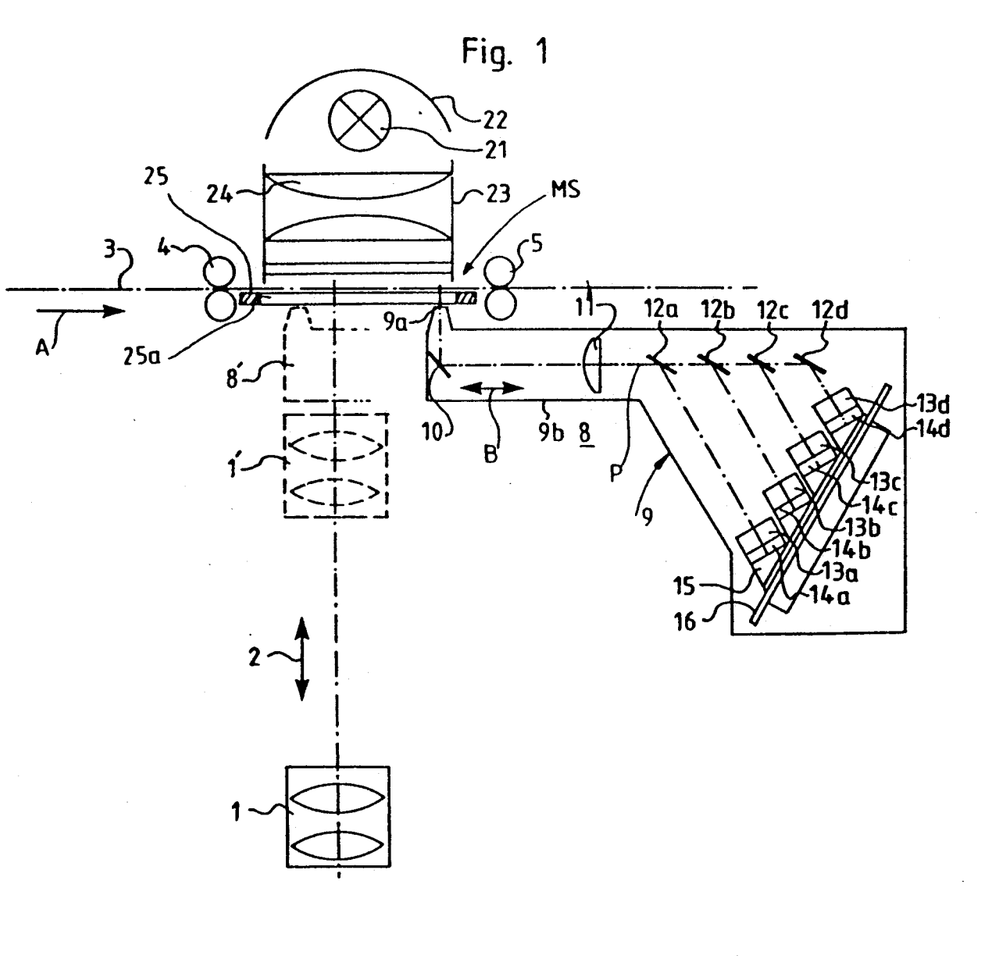
FIG. 1 is a fragmentary schematic partly front elevational and partly longitudinal vertical sectional view of an apparatus which embodies one form of the invention.
Figure 2:
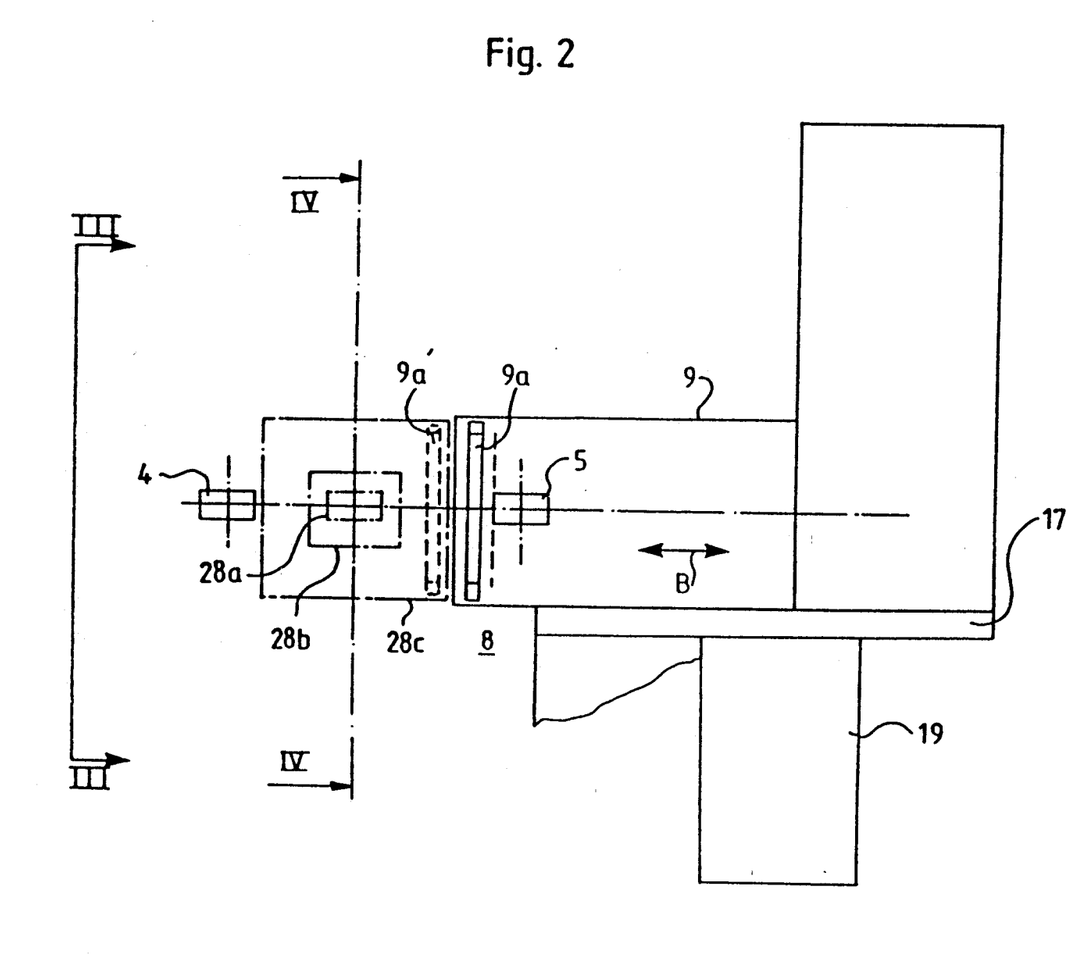
FIG. 2 is a plan view of the structure which is shown in FIG. 1.
Figure 3:
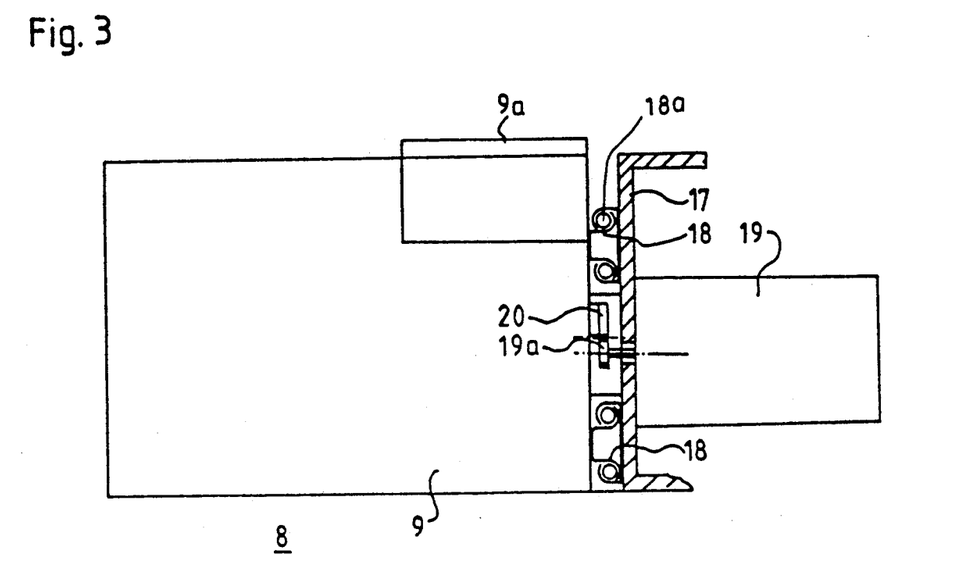
FIG. 3 is an end elevational view of the monitoring device and of means for transporting the monitoring device, substantially as seen in the direction of arrows from the line III—III of FIG. 2 and with a support for the motor of the transporting means shown in section.

The apparatus which is shown in FIGS. 1 to 4 comprises an objective lens 1 which serves to project a sharp image of a longer section 3 of photographic material onto a running web (not shown) of photographic paper or other suitable photosensitive material. Reference may be had to FIG. 2 of commonly owned U.S. Pat. No. 4,627,719. The disclosure of this patent is incorporated herein by reference. More specifically, the objective lens 1 can image that portion (e.g., one of a series of successive neighboring exposed and developed frames of a customer film) which registers with a window 25a provided in a mobile frame 25 the details of which will be described with reference to FIG. 4. The objective lens 1 is located at one side of the substantially horizontal (predetermined) path for the longer section 3, and the apparatus further comprises a radiation source 21 (e.g., a source of visible light) which is located at the other side of the path for the longer section 3 and emits radiation which is directed by a reflector 22 behind and a light mixing duct 23 in front of the source 21. The duct 23 contains one or more condenser lenses 24 and a customary diffuser disc for directed light which illuminates that part of the longer section 3 which overlies the window 25a.

The objective lens 1 is movable in the direction of its optical axis (note the double-headed arrow 2) between a first position (shown by solid lines) at a maximum distance from the window 25a and a second position (indicated by broken lines, as at 1') in which the lens is nearer to but is still spaced apart from the path for the longer section 3. The image of the film frame in the window 25a on a web of photosensitive material is largest when the objective lens 1 is moved to the position 1'.

The apparatus of FIGS. 1 to 4 is a combined monitoring and copying apparatus. The mode of ascertaining the characteristics (including the density) of longer sections 3 of photographic material and for thereupon making copies of film frames forming part of a freshly monitored section 3 is analogous to that described in the referenced U.S. Pat. No. 4,627,719. Thus, a longer section 3 is monitored while advancing in the direction of arrow A and is thereupon copied, on the basis of information gathered during monitoring, while being moved in a second direction, namely counter to that indicated by the arrow A, but along the same path. The means for advancing longer sections 3 in the direction of arrow A includes a first pair of advancing rolls 4 upstream of a monitoring station MS (as seen in the direction of arrow A) and a second pair of advancing rolls 5 downstream of the station MS. The same pairs of rolls are thereupon used to move a freshly monitored longer section 3 counter to the direction of arrow A. Each longer section 3 can be continuously advanced in the direction of arrow A and can be moved stepwise in the opposite direction so that the section 3 is at a standstill while the frame which overlies the window 25a is being imaged onto photographic paper or the like. A first receptacle for a convoluted longer section is normally provided to the left of the advancing rolls 4 in FIG. 1, and a second receptacle for convoluted longer sections can be provided to the right of the advancing rolls 5. Reference may be had again to U.S. Pat. No. 4,627,719. The information which is obtained during monitoring of a longer section 3 (while such section advances in the direction of arrow A) is used to properly position and to properly illuminate successive frames of the longer section in the course of the copying operation. The frame 25 at the monitoring station MS (this station constitutes the copying station while a longer section 3 is being moved in a direction counter to that indicated by the arrow A) comprises suitable guide means (shown at 25c in FIG. 4) for a longer section during monitoring as well as during copying. The guide means 25c further serves to facilitate threading of the leader of a fresh longer section 3 into the apparatus, namely the advancement of such leader from the nip of the advancing rolls 4, through the monitoring station MS and into the nip of the advancing rolls 5.

The device which serves to monitor longer sections 3 or shorter sections 103 (FIG. 4) is denoted by the character 8 and includes a housing 9 having a relatively narrow portion 9b provided with a relatively narrow slit-shaped radiation admitting inlet 9a which is normally adjacent one marginal portion of the window 25a. The monitoring device 8 can be transported in and counter to the direction of arrow A (note the double-headed arrow B) between the solid-line position and the broken line position (8') of FIG. 1. The narrow portion 9b of the housing 9 can be moved along the window 25a (in and counter to the direction which is indicated by the arrow A) in each position of the objective lens 1, i.e., also when the lens 1 assumes the second end position 1'.

The housing 9 confines a deflecting member 10 here shown as a fully reflecting mirror which is located at an angle of 45° to the optical axis of the objective lens 1 and is disposed behind the inlet 9a of the housing portion 9b so that it deflects incoming radiation into a second path P which is or can be parallel to the path for longer sections 3 of photographic material. An objective 11 is installed in the housing 9 in the path P between the mirror 10 and a radiation dividing means including a series of partly transmitting mirrors 12a, 12b, 12c and a reflecting mirror 12d. The mirrors 12a to 12d deflect certain portions of radiation from the path P against the associated photoelectric signal generating elements 14a, 14b, 14d, 14d in the housing 9. The mirrors 12a to 12d can be oriented to deflect corresponding portions of radiation from the path P at an angle of 45°, and the arrangement may be such that the mirrors 12a to 12d constitute dichroic mirrors so that each thereof only reflects radiation of a particular color. The positions of the objective 11 and photoelectric elements 14a-14d (hereinafter called photocell receives a selected in such a way that each photocell receives a sharp image of a portion at least of that frame of a longer section 3 which overlies the window 25a at the monitoring station MS.

The photocells 14a to 14d are located behind associated filters 13a, 13b, 13c, 13d, respectively. The filters 13b, 13c, 13d sensitize the respective photocells 14b, 14c, 14d for the primary colors red, green and blue, respectively. The first photocell 14a is not colored and furnishes a gray scale value which can be utilized for detection of frame lines between neighboring film frames as well as for density measurement. The photocells 14a to 14d are mounted on a stepped carrier 15 in such a way that their sensitive surfaces extend at right angles to the beams of radiation which are diverted from the path P by the respective mirrors 12a to 12d. The carrier 15 is in direct contact with a printed circuit board 16 at least one side of which is coated with a layer of copper or other conductive material and is suitably treated to provide paths for transmission of electric signals from the photocells 14a-14d to an evaluating circuit, e.g., a microprocessor of the type described and shown in the referenced U.S. Pat. No. 4,627,719. Such signals are utilized during copying of the respective film frames.

The housing 9 of the monitoring device 8 is sealed, save for the radiation admitting inlet 9a, and confines the aforementioned mirrors 10, 12a-12d and the objective 11 as well as the photocells 14a-14d, the filters 13a-13d, the carrier 15 and the circuit board 16. The guide means for the housing 9 of the monitoring device 8 is shown in greater detail in FIGS. 2 and 3. Such guide means comprises rails 18 which are provided on the housing 9 or on a stationary support 17, and rolling elements 18a for such rails. The rolling elements 18a are provided on the support 17 or on the housing 9, and the means for transporting the housing 9 in and counter to the direction of arrow A comprises a rack-and-pinion drive 20, 19a and a reversible electric stepping motor 19 having an output element which carries the pinion 19a. The motor 19 is mounted on the stationary support 17, and the pinion 19a mates with the rack 20 which is provided on the housing 9. The motor 19 receives signals from a tachometer generator, not shown, so that it can move the housing 9 along a shorter section 103 in stepwise fashion during transport of the housing counter to the direction which is indicated by the arrow A, i.e., during monitoring of a stationary shorter section 103. The tachometer generator ensures that the housing 9 can be transported stepwise in a direction to the left, as viewed in FIG. 1, until the inlet 9a reaches the left-hand marginal portion of a second window 25b of the frame 25. The shorter section 103 is thereupon copied while the film frame in the window 25b is illuminated in accordance with corresponding signals which are stored in the memory of the microprocessor receiving signals from the photocells 14a–14d during advancement of the housing 9 counter to the direction indicated by the arrow A.

The housing 9 of the monitoring device 8 is transported counter to the direction of arrow A (from the solid-line position to the broken-line position 8' of the monitoring device) when the monitoring station MS receives a shorter section 103 which then overlaps the second window 25b of the frame 25 and is maintained in such position of overlap by a holding means 26 of the frame 25. Thus, the transporting means including the motor 19 and the rack-and-pinion drive 20, 19a can transport the inlet 9a between a position of alignment with the right-hand marginal portion and a position of alignment with the left-hand marginal portion of the window 25a (as viewed in FIG. 1). As already mentioned above, the height of the housing portion 9b is selected in such a way that this housing portion is free to move along the monitoring station MS in each position of the objective lens 1.

The improved apparatus can be used for the monitoring of sections 3 having different widths. FIG. 2 shows, by phantom lines, one frame of a narrow section 28a, one frame of a film section 28b of medium width, and one frame of a film section 28c of maximum width. All that is necessary is to install the guide means 25c on the frame 25 for movement in directions indicated by a double-headed arrow C so as to increase or reduce the width of the path for longer sections 3 through the monitoring station MS. Alternatively, the apparatus can be furnished with a set of frames 25, one for each of several formats of strip-shaped customer films. The inlet 9a of the housing 9 is moved to a different position for each film format, i.e., the inlet 9a is moved to a position adjacent the right-hand marginal portion of that part of the window 25a which is located outside of the path of a selected longer section 3 before the longer section of a particular format is set in motion. For the smaller formats 28a, 28b, the initial position of the inlet 9a will be nearer to the optical axis of the objective lens 1 than for the larger format 28c. In FIG. 1, the position of the inlet 9a corresponds to that which is required when the rolls 4, 5 advance a longer section having the format 28c.

Figure 4:
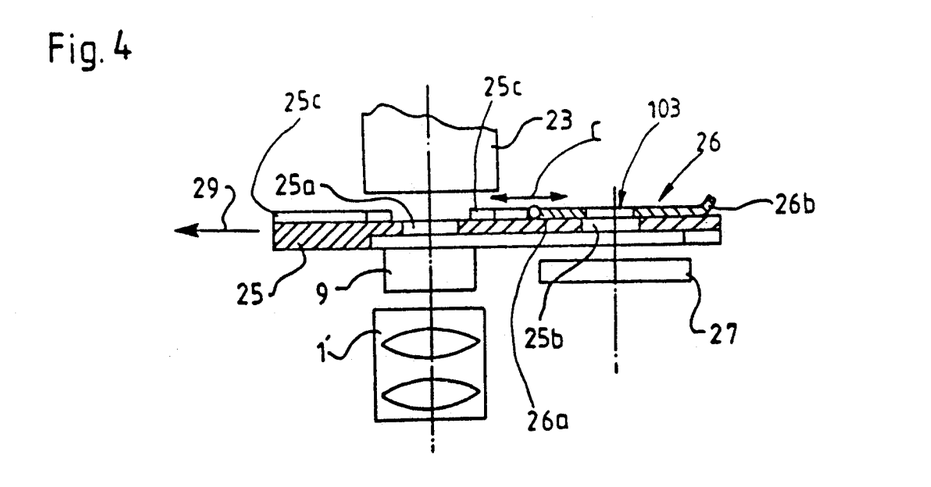
FIG. 4 is a transverse sectional view, substantially as seen in the direction of arrows from the line IV—IV of FIG. 2, and shows a mobile frame for windows which can be moved to or away from the monitoring station.

The arrow 29 indicates in FIG. 4 the direction in which the frame 25 is movable from the illustrated first position in which the window 25a is located at the monitoring station MS to a second position in which the window 25a is moved out of the way and the station MS is aligned with the second window 25b of the frame 25. The frame 25 can be moved between its two positions by hand or by a suitable prime mover or linkage, not shown. The direction of movement of the frame 25 from the first to the second position is at right angles to the direction which is indicated by the arrow A, and the direction of advancement of a longer section 3 along its path is normal to the row of photocells 14a–14d in the housing 9 of the monitoring device 8. The frame 25 is disposed between the two pairs of advancing rolls 4 and 5. The holding means 26 and the window 25b are accessible in the first position of the frame 25 so that a shorter section 103 (e.g., a single film frame) can be properly positioned to overlie the window 25b and to be reliably clamped by the holding means 26 before the frame 25 is moved in the direction of arrow 29 so as to move the window 25b (and hence the properly clamped shorter section 103) into the monitoring station MS. The holding means 26 can include a plate which is pivotally secured to the main portion of the frame 25 by a hinge 26a and includes a handgrip portion 26b. A spring (not shown), e.g., a torsion spring which is convoluted around the pintle of the hinge 26a, is provided to bias the holding means 26 to the position of FIG. 4 in which a shorter section 103 is clamped against the adjacent surface of the main portion of the frame 25.

An illuminating device 27 is provided in the casing of the improved apparatus to illuminate the window 25b and the holding means 26 so that a shorter section 103 can be properly clamped in a position in which the interesting part of the image on the section 103 is in an optimum position for monitoring by the device 8 (which is then transported by the motor 19 and drive 20, 19a) and for subsequent imaging onto a web of photographic paper or other suitable photosensitive material. Once a shorter section 103 is properly held in alignment with the window 25b, the frame 25 is moved in the direction of the arrow 29 and the conversion of the apparatus for monitoring and copying of shorter sections is completed.

The mode of operation is as follows:

If the apparatus is to be used for the copying of one or more longer sections 3, the monitoring device 8 is transported to the position which is shown in FIG. 1 by solid lines, i.e., the inlet 9a of the housing 9 is in register with the right-hand marginal portion of and is adjacent the window 25a (the frame 25 is assumed to be held in the (first) position of FIG. 4). As already discussed hereinabove, the position of the inlet 9a will depend upon the format of the longer section 3 in the path which is defined by the advancing rolls 4 and 5. The inlet 9a will be moved closer to the optical axis of the objective lens 1 if the format of the section 3 is smaller. The leader of a longer section 3 is then advanced through the nip of the advancing rolls 4, across the window 25a at the monitoring station MS, and into the nip of the advancing rolls 5. The apparatus is then ready to ascertain the characteristics of the properly introduced longer section 3 which is advanced by the pairs of rolls 4, 5 and is illuminated by radiation issuing from the source 21 and being directed by the reflector 22 and duct 23. The inlet 9a admits radiation against the mirror 10 which reflects the incoming radiation into the path P. The objective 11 directs the reflected radiation against the mirrors 12a–12d which, in turn, deflect certain parts of the radiation against the respective photocells 14a–14d. Signals which are generated by the photocells 14a–14d are transmitted to the microprocessor which evaluates and processes the signals, e.g., in a manner as described in commonly owned U.S. Pat. No. 4,279,502 granted Jul. 21, 1981 to Siegfried Thurm et al. to which reference may be had, if necessary. The longer section 3 is scanned, line-by-line, at successive intervals so that the memory of the microprocessor receives and stores information pertaining to all frames of a longer section 3. When the trailing end of the longer section 3 reaches the advancing rolls 5, the direction of advancement of the section 3 is reversed in a manner as described and shown in the referenced U.S. Pat. No. 4,627,719, i.e., the section 3 is moved to the left, as viewed in FIG. 1, and such movement is terminated when the trailing end (i.e., originally the leader) of the section 3 reaches the rolls 4.

If the apparatus is to be converted for the monitoring and copying of shorter sections 103, a section 103 is installed beneath the holding means 26 while the frame 25 is maintained in the position of FIG. 4. The frame 25 is then moved in the direction of arrow 29. The arrangement may be such that the motor 19 is started in automatic response to completion of movement of the frame 25 in the direction of arrow 29. The motor 19 then transports the housing 9 of the monitoring device 8 in stepwise fashion at a predetermined frequency so that the inlet 9a moves stepwise past the shorter section 103 at the monitoring station MS. The stepwise movement of the housing 9 is terminated when the monitoring of the entire shorter section 103 at the station MS is completed. The corresponding signals from the photocells 14a–14d are transmitted to the microprocessor. The direction of operation of the stepping motor 19 is thereupon reversed so that the housing 9 of the monitoring device 8 is returned to the solid-line position of FIG. 1. The shorter section 103 at the station MS is then ready to be imaged upon a photosensitive material while the frame 25 and the housing 9 are stationary. The copying operation is carried out in accordance with signals which are stored in the memory of the microprocessor.

The inlet 9a of the housing 9 need not always be positioned at one marginal portion of the window 25a or 25b, i.e., at one margin of that part of a section 3 or 103 which happens to be disposed at the station MS. For example, if it is advisable or necessary for the purposes of more satisfactory illumination and monitoring, the inlet 9a can be moved beyond the broken-line position 9a' of FIG. 2 to a position of alignment with the optical axis of the objective lens 1. This might be desirable or necessary if the rolls 4, 5 are to advance a longer section 3 having a large number of film frames. The transporting means including the motor 19 and the drive 20, 19a is thereupon set in motion to return the housing 9 to a position in which the inlet 9a is adjacent one marginal portion of the window 25a or 25b preparatory to monitoring of standard longer sections 3 or a shorter section 103.

The speed at which the monitoring device 8 is transported by the motor 19 and drive 20, 19a need not be the same as the speed of advancement of a longer section 3 relative to the (then stationary) monitoring device. This will be readily appreciated since the monitoring of a relatively long section 3 takes up a rather long interval of time in contrast to the monitoring of a shorter section 103. Relatively slow transport of the monitoring device 8 with reference to a stationary shorter section 103 at the monitoring station MS is desirable on the additional ground that the mass and inertia of the housing 9 and of its contents are rather substantial. Relatively slow transport is desirable on the further ground that the construction of the means for transporting the rather heavy and bulky monitoring device 8 along the window 25b can be simplified, with attendant reduction of cost, if the housing 9 is to be transported at a relatively low speed. As already mentioned above, such design of the transporting means (to move the housing 9 at a relatively low speed) contributes very little to the overall period of time which is required to complete the monitoring and copying of a short section 103.

Figure 5:
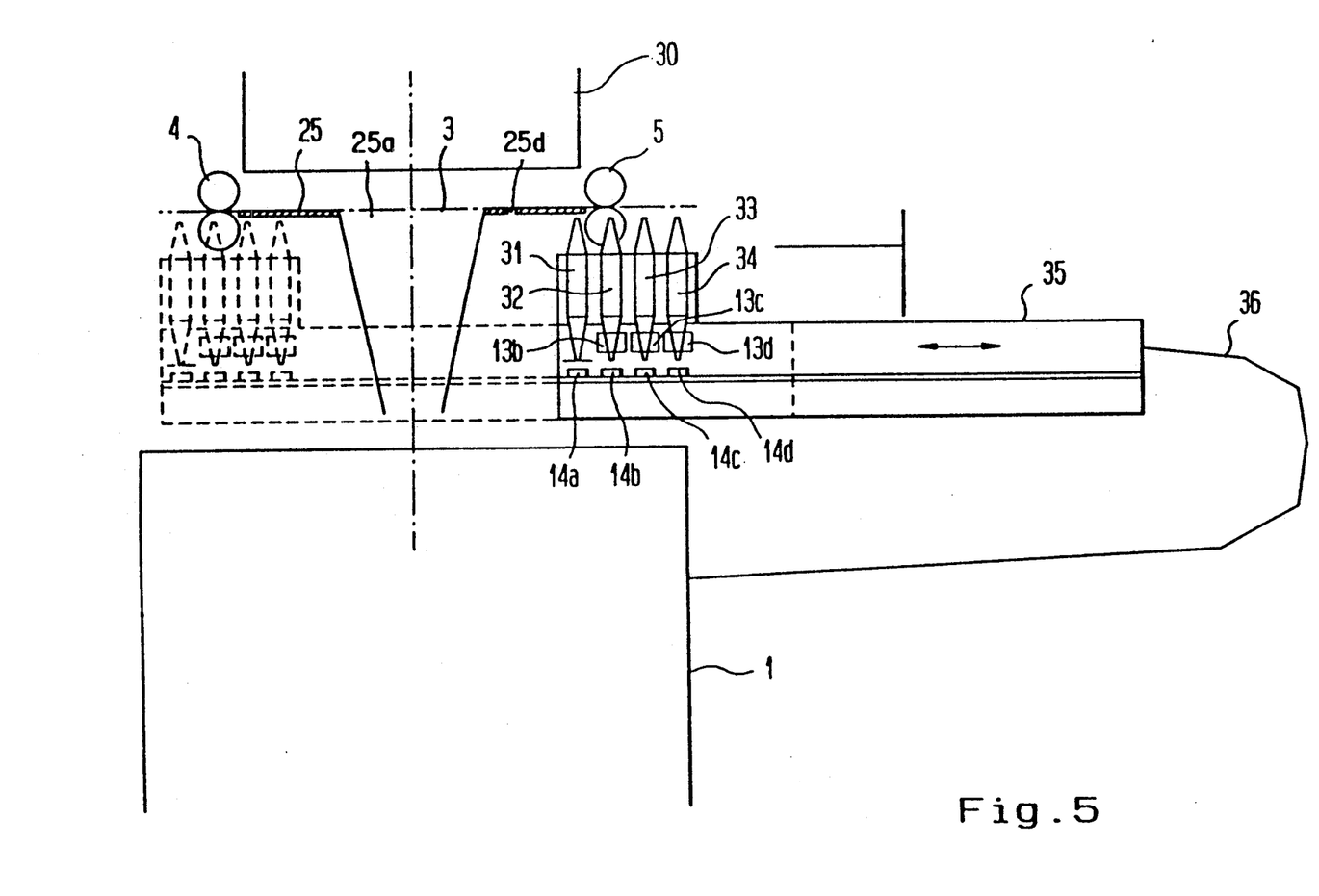
FIG. 5 is a fragmentary schematic partly front elevational and partly longitudinal vertical sectional view of an apparatus which embodies another form of the invention.

FIG. 5 shows certain details of a second apparatus. All such parts of the apparatus of FIG. 5 which are identical with or clearly analogous to corresponding parts of the apparatus of FIGS. 1 to 4 are denoted by similar reference characters. The main difference between the apparatus of FIGS. 1 to 4 on the one hand, and the apparatus of FIG. 5 on the other hand, is that the apparatus of FIG. 5 employs a simpler and less expensive monitoring device. More particularly, the apparatus of FIG. 5 employs a set of optical elements 31, 32, 33 and 34, one for each of the four photoelectric elements or photocells 14a, 14b, 14c, 14d. This renders it possible to dispense with the rather costly combination of mirror 10, objective 11 and mirrors 12a to 12d which are employed in the monitoring device 8 of the apparatus shown in FIGS. 1 to 4.

The optical elements 31 to 34 are spaced apart from each other in the direction of advancement of a longer section 3 (indicated by a phantom line) along its path at a predetermined distance above the optical elements. These optical elements are equidistant from each other and are disposed in planes which are normal to the path of movement of a longer section 3. A mobile carriage 35 is provided to support and move the optical elements 31 to 34 and the associated photocells 14a to 14d in and counter to the direction of advancement of a longer section 3. The means for moving the carriage 35 between a plurality of positions relative to the monitoring stations comprises a toothed rack on the carriage 35 and a reversible stepping motor having a rotary output element with a pinion which meshes with the rack. The carriage 35 can move the elements 31 to 34 and the associated photocells 14a to 14d (as well as the color filters 13b, 13c, 13d between the elements 32-34 and the respective photocells 14b-14d) between the solid-line position and the broken-line position of FIG. 5 as well as to a further or intermediate position in which the elements 31 to 34 register with the window 25a at the monitoring station.

In accordance with one presently preferred embodiment, the optical elements 31 to 34 can constitute a row of relatively inexpensive microlenses with a gradual progress of refractive index from the middle toward the edge or edges. Suitable microlenses are distributed, for example, by the Japanese Firm Nippon Sheet Glass Co. Ltd., Tokyo, in the form of twin-row series of lenses having a combined length of 20 mm and arranged to be installed at a distance of 12 mm, as measured from the end of a lens, from the corresponding object plane. Alternatively, one can employ a one-piece set of optical elements. Such set can be formed in an injection molding or another suitable machine from a plastic material. Each lens of the one-piece set or array of plastic lenses cooperates with a tubular diaphragm assembly (not shown) to prevent cross talk between neighboring portions of a monitored section at the monitoring station. An optical element of the just outlined character is associated with each photocell. Any side reversal in the event of simple optical imaging would be of no consequence. Alternatively, one could employ an imaging system of the type described in U.S. Pat. No. 3,592,542, namely a system with dual image reversal, two lens planes and field lenses between such planes. The disclosure of this patent is incorporated herein by reference.

The mounting of optical elements 31 to 34 on the carriage 35 is such that the object plane coincides with the plane of the section 3 at the monitoring station and the photosensitive surfaces of the photocells 14a to 14d are located in the focal planes of the optical elements. Filters 13b to 13d are used if the optical elements 32 to 34 are color sensitized.

When the apparatus is idle or in the course of a copying operation, the photocell 14a (which generates signals denoting the gray scale value of the section at the monitoring station) registers with an opening 25d of the frame 25. Such opening is adjacent the window 25a and is in line with perforations of the section 3 at the monitoring or is positioned to enable the photocell 14a to transmit signals denoting the gray scale value across the width of the section 3 which is being advanced along its path. If the section 3 is a non-perforated film (such as a film of the type known as format No. 120), detection of frame lines between successive exposed and developed film frames (for proper positioning of a film frame at the monitoring station) can be carried out in a manner as described, for example, in commonly owned U.S. Pat. No. 4,947,205 granted Aug. 7, 1990 to Benker et al. for "Method of and apparatus for positioning photographic originals in a copying station", namely by determining the gray scale value along a narrow gap transversely of the direction of advancement of a longer section 3. The disclosure of this patent is incorporated herein by reference.

The distance of the optical elements 31 to 34 from the path of movement of a longer section 3 can be selected in such a way that it exceeds (or is at most matched by) at least the diameter of that advancing roll 4 and/or 5 which is located at the same side of the path for the sections 3.

The distance of the optical elements 31-34 from the plane of the film section 3 in FIG. 5 is greater than the diameters of the lower advancing rolls 4, 5. This enables the optical elements 31-34 to bypass such rolls during movement of the carriage 35 to and from the broken position.

The mode of operation of the apparatus of FIG. 5 is as follows:

The radiation source or sources in the lamp casing 30 ensure uniform illumination of the window 25a and opening 25d. When the device including the photocells 14a-14d is to monitor an advancing longer section 3, the carriage 35 is maintained in the aforementioned intermediate position in which the four optical elements 31 to 34 are aligned with the window 25a. The conductor means 36 which connects the signal generating photocells 14a to 14d with the memory of a computer then transmits four signal sequences corresponding to the gray scale value and the respective color densities of monitored parts of the film frame at the monitoring. The corresponding signals are stored in the computer memory by considering the distance of the photocells from the monitored parts of the film frame as well as to ensure that the color density values for any particular measured part are brought together for proper copying.

If the apparatus of FIG. 5 is used for the monitoring of a stationary section 103, the window 25b is moved to the position previously occupied by the window 25a while the carriage 35 is held in or close to the broken-line position. The illustrated broken-line position is but one of several available leftmost positions of the carriage 35, depending on the format of a shorter section 103 and/or upon the dimensions of the window 25b. This saves time for movement of the carriage 35 during copying of the image of a single section 103 at the monitoring station. The location of the carriage the broken-line position (at or close to 35') is to be selected in such a way that the optical element 34 is adjacent the left-hand margin of the image on the single section 103 at the monitoring station. The single frame 103 is clamped (e.g., in a manner as described with reference to FIG. 4) while the carriage 35 moves from the broken-line position (or from close to such position) in a direction to the right along the fixedly held section 103 so that the entire section 103 is monitored and the signal transmitting means 36 transmits a set of appropriate signals to the computer memory. The copying operation can begin immediately thereafter without any further adjustments.

An important advantage of the improved apparatus is its versatility. Thus, the apparatus can be used to monitor relatively long sections 3 of photographic material by advancing such long sections relative to the monitoring device 8, and the latter is simply transported relative to the monitoring station after the frame 25 is moved to the (second) position in which the window 25b is overlapped by a shorter section 103 and is located at the monitoring station. The monitoring device 8 is moved out of the way when the apparatus is to image a longer section 3 or a shorter section 103 onto a web of photographic paper or the like. Thus, the method and apparatus of the present invention exhibit all advantages of the method and apparatus of the referenced U.S. Pat. No. 4,627,719 as well as the additional advantages of simplifying the monitoring and copying of relatively short sections of photographic material.

It is equally within the purview of the invention to employ optical elements of the type shown in and described with reference to FIG. 5 in high-output printing apparatus. This merely necessitates the utilization of a stationary monitoring device which is adjacent the monitoring station (window 25a) and has means for generating signals which denote the characteristics of increments of a section which is located at the monitoring station and moves relative to the monitoring device including optical elements and photosensitive elements. In other words, it is necessary to provide means for establishing a relative movement between the monitoring device and the film section at the monitoring station.

The optical elements which are to be used in the just outlined apparatus can comprise microlenses with a gradual progress of refractive index or a series of coherent lenses, particularly coherent lenses which are of one piece.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for ascertaining the characteristics, including the density, of longer and shorter sections of photographic material, comprising means for advancing longer sections along a predetermined path through a monitoring station which is arranged to receive discrete shorter sections; a monitoring device located at one side of said predetermined path adjacent the latter and having an array of detectors including means for generating signals denoting the characteristics of successive increments of a longer section which is being advanced along said path, said array comprising at least one row of photosensitive elements, and said advancing means including means for advancing longer sections transversely of said at least one row of photosensitive elements; means for transporting said monitoring device past a shorter section at said station so that said signal generating means can generate signals denoting the characteristics of the shorter section at said station; a frame having at least one window at said monitoring station, said monitoring device being disposed at said at least one window during advancement of a longer section along said path and during transport of said device past a shorter section at said station; a radiation source at the other side of said path; and means for directing radiation from said source through a section at said station and through said at least one window, said device having means for imaging at least part of a section at said station onto said photosensitive elements.

2. The apparatus of claim 1, wherein said at least one window has a marginal portion and said device has a radiation admitting inlet which is adjacent said marginal portion while a longer section is being advanced along said path.

3. The apparatus of claim 1, wherein said imaging means comprises means for deflecting radiation which has passed through a section at said station into a second path, and radiation dividing means located in said second path and including means for diverting deflected radiation against said photosensitive elements, said second path being at least substantially parallel to said predetermined path.

4. The apparatus of claim 1, wherein said imaging means comprises means for deflecting radiation which has passed through a section at said station into a second path, and radiation dividing means located in said second path and including means for diverting deflected radiation against said photosensitive elements, said deflecting means including a first mirror and said diverting means including partially transmitting second mirrors.

5. The apparatus of claim 4, wherein said device includes a housing having an inlet which guides radiation against said deflecting means.

6. The apparatus of claim 4, wherein said imaging means further comprises an objective in said second path between said deflecting means and said diverting means.

7. The apparatus of claim 1, wherein said imaging means comprises means for deflecting radiation which has passed through a section at said station into a second path, and radiation dividing means located in said second path and including means for diverting deflected radiation against said photosensitive elements; and further comprising an objective lens disposed at said one side of said predetermined path and movable between a first position remote from and a second position nearer to but spaced apart from said at least one window, said device further having a housing for said deflecting means and said diverting means, said housing having a portion provided with a radiation admitting inlet, and said portion of said housing being movable along said at least one window between said lens and said at least one window in the second position of said lens.

8. The apparatus of claim 1, wherein said imaging means comprises optical elements each arranged to image at least part of a section at said station onto one of said photosensitive elements.

9. The apparatus of claim 8, wherein said optical elements include means for imaging strip-shaped portions of a section at said station onto said photosensitive elements.

10. The apparatus of claim 8, wherein each of said optical elements comprises a microlens with a gradual progress of refractive index.

11. The apparatus of claim 8, wherein said optical elements comprise a series of coherent lenses and a diaphragm for each of said coherent lenses.

12. The apparatus of claim 11, wherein said coherent lenses are of one piece.

13. The apparatus of claim 8, wherein said transporting means comprises a carriage for said optical elements and said photosensitive elements, and means for moving said carriage relative to said station along said path.

14. The apparatus of claim 8, wherein said path is elongated and said at least one window has a predetermined width longitudinally of said path, said optical elements having a combined width longitudinally of said path which at least approximates said predetermined width, and said means for moving said carriage having means for moving said carriage between a first position at one side and a second position at the other side of said at least one window.

15. The apparatus of claim 14, wherein said means for moving said carriage includes means for moving said carriage to a further position in which said optical elements register with said at least one window while a longer section is being advanced along said path.

16. The apparatus of claim 8 for ascertaining the characteristics of multicolored sections of photographic material, wherein each of said optical elements is arranged to transmit a different color image of at least part of a section at said station onto the respective photosensitive element.

17. The apparatus of claim 8, further comprising color filters between at least some of said optical elements and the respective photosensitive elements.

18. The apparatus of claim 8, wherein said optical elements comprise a series of coherent lenses.

19. The apparatus of claim 1, wherein said further comprising a computer having a memory, and means for transmitting signals from said photosensitive elements to said memory.

20. The apparatus of claim 19, wherein said path is elongated and said photosensitive elements are spaced apart from each other longitudinally of said path, said transmitting means including means for transmitting to said memory signals with a delay corresponding to the spacing of said photosensitive elements.

21. The apparatus of claim 1, wherein said photosensitive elements include at least one element which transmits signals denoting the gray scale value of a section at said station.

22. The apparatus of claim 1, wherein said optical elements are disposed at a predetermined distance from and at one side of said path, said advancing means including at least one pair of advancing rolls and said at least one pair having a roll at said one side of said path, at least said roll at said one side of said path having a diameter which at most equals said predetermined distance.

23. Apparatus for ascertaining the characteristics, including the density, of longer and shorter sections of photographic material, comprising means for advancing longer sections along a predetermined path through a monitoring station which is arranged to receive discrete shorter sections; a monitoring device adjacent said path and having an array of detectors including means for generating signals denoting the characteristics of successive increments of a longer section which is being advanced along said path; means for transporting said monitoring device past a shorter section at said station so that said signal generating means can generate signals denoting the characteristics of the shorter section at said station, said transporting means including a toothed drive and a motor for said drive; and guide means for said device.

24. The apparatus of claim 23, wherein said array comprises at least one row of photosensitive elements and said advancing means includes means for advancing longer sections transversely of said at least one row of photosensitive elements.

25. The apparatus of claim 23, further comprising a frame having at least one window at said monitoring station, said monitoring device being disposed at said at least one window during advancement of a longer section along said path and during transport of said device past a shorter section at said station.

26. The apparatus of claim 23, wherein said guide means comprises a stationary support, rolling elements on said support and rails provided on said device and engaging with and movable along said rolling elements.

27. The apparatus of claim 23, wherein said motor is a stepping motor.

28. Apparatus for ascertaining the characteristics, including the density, of longer and shorter sections of photographic material, comprising means for advancing longer sections along a predetermined path through a monitoring station which is arranged to receive discrete shorter sections; a monitoring device adjacent said path and having an array of detectors including means for generating signals denoting the characteristics of successive increments of a longer section which is being advanced along said path; means for transporting said monitoring device past a shorter section at said station so that said signal generating means can generate signals denoting the characteristics of the shorter section at said station; and a frame having first and second windows and being movable relative to said station between a first position in which said first window is located at said station and is adjacent said path for longer sections, and a second position in which said second window is located at said station in a position to be overlapped by a shorter section.

29. The apparatus of claim 28, wherein said frame includes guide means for longer sections.

30. The apparatus of claim 28, wherein said frame includes means for holding a shorter section in a predetermined position relative to said second window.

31. The apparatus of claim 28, wherein said second window is accessible in the first position of said frame to permit the placing of a shorter section to a position of overlap with said second window.

32. The apparatus of claim 31, further comprising means for illuminating said second window in the first position of said frame.

* * * * *